United States Patent [19]

Biek

[11] Patent Number: 4,619,435
[45] Date of Patent: Oct. 28, 1986

[54] CONTROL VALVE APPARATUS FOR PNEUMATIC TOOLS

[75] Inventor: Paul A. Biek, Houston, Tex.

[73] Assignee: Dresser Industries, Inc., Dallas, Tex.

[21] Appl. No.: 707,925

[22] Filed: Mar. 4, 1985

[51] Int. Cl.[4] .......................................... F16K 31/143
[52] U.S. Cl. ....................................... 251/25; 251/32; 251/113; 91/529; 91/534; 137/625.26
[58] Field of Search ................... 137/625.26, 596.15; 91/534, 529, 536; 251/25, 32, 113

[56] References Cited

U.S. PATENT DOCUMENTS 1,465,540  8/1923  Brandriff ...................... 137/625.26
3,187,770  6/1965  Plamann ...................... 137/625.26 X
3,323,602  6/1967  Lysell .......................... 137/625.26 X Primary Examiner—Arnold Rosenthal
Attorney, Agent, or Firm—Roy L. Van Winkle; Richard M. Byron

[57] ABSTRACT

An improved flow control valve apparatus for pneumatically powered tools that include a motor and feed and retract apparatus driven by the motor. The control valve apparatus includes a main flow valve and a retract control valve each of which is controlled by the control valve to provide air to the motor, to automatically stop the feed and retract motion of the tool, and to stop the tool completely when desired.

5 Claims, 10 Drawing Figures

CONTROL VALVE APPARATUS FOR PNEUMATIC TOOLS

BACKGROUND OF THE INVENTION

This invention relates generally to an improved control valve for use with pneumatically powered tools. More particularly, but not by way of limitation, this invention relates to an improved control valve apparatus that provides control of the main air flow to the tool motor, venting for quick shut-off, and an override to provide for the resumption of operation.

Control valve apparatus for pneumatic tools, such as drills, cause the drill spindle to move in reciprocating motion (feed and retract), that is, in a direction perpendicular to the longitudinal axis of the drill to accomplish the desired drilling operation. It is necessary to limit such motion and to cause the motion to either stop or change to the other motion to avoid damage to the drill.

Initially, the motion of such tools were partly manually controlled, that is, the drill operator stated started the feed motion, and subsequently stopped the tool when the end of the retract motion was reached. If the operator was not present when the end of the particular motion was reached, damage could occur to the tool.

SUMMARY OF THE INVENTION

An object of this invention is to provide an improved control valve for tools, such as right angle drills, that automatically "feeds" when the motor is started, that automatically reverses from "feed" to "retract", and that shuts off at the end of the "retract" motion to prevent damage to the tool.

This invention then provided an improved control valve apparatus for use with tools having a pneumatic motor therein. The apparatus includes: a valve housing having a flow passageway extending therethrough and a valve seat encircling the passageway; and a flow valve member located in said passageway for movement toward and away from said valve seat preventing and permitting flow therethrough to the motor. The apparatus also includes a control valve member movably located in a bore in the housing. The control valve member has a portion of reduced size and carries spaced first and second seal members. An annular seat in the bore loosely encircles the control valve member. The housing has a supply passageway that extends from the flow passageway to the bore on one side of the seat, a first control passageway that extends from the bore on the other side of the seat to a chamber in the housing, a second control passageway for supplying air to other portions of the tool, and a vent passageway for venting air from the first and second control passageways. The control valve member is movable from an open position wherein the first control passageway is open and the second seal member prevents flow through the vent passageway to a closed position wherein the first seal member engages the seat preventing flow from the supply passageway to the control passageways and the vent passageway is open, and to an override position wherein the area of reduced size on the control valve member is located adjacent to the seat providing an excess of air flow to the second control passageway.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
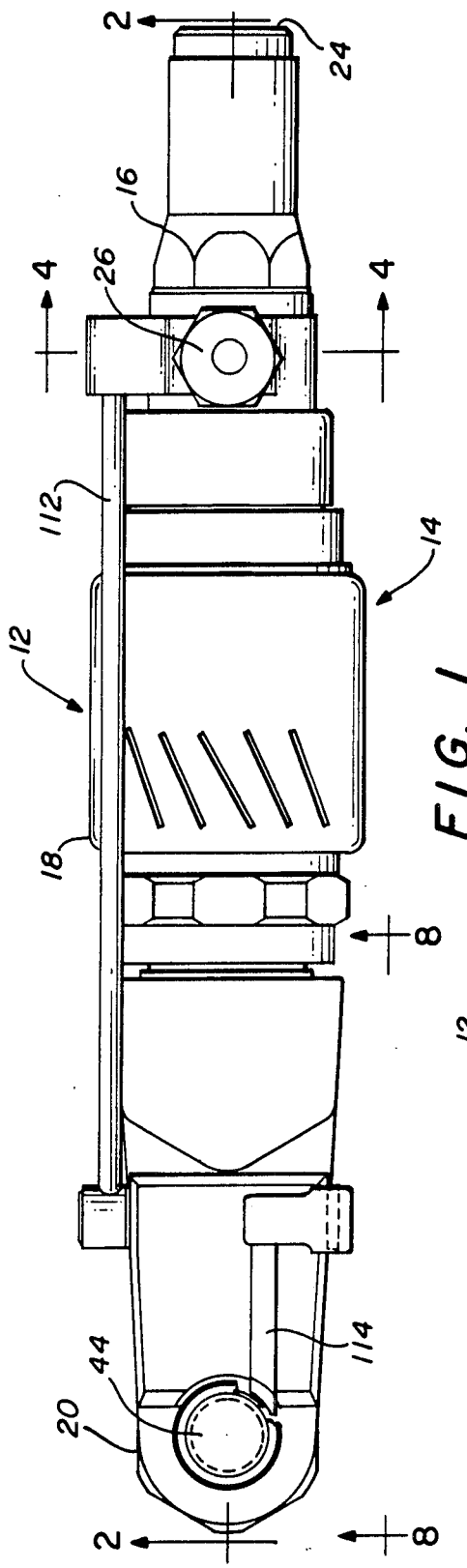
FIG. 1 is a top plan view of a right angle drill that is constructed in accordance with the invention.

Referring to the drawing and to FIG. 1 in particular, shown therein and generally designated by the reference character 12, is a right angle drill that is constructed in accordance with the invention. The drill 12 includes a housing 14 comprising an inlet or control end portion 16, a motor and gear housing portion 18, and a drill head portion 20.

Figure 2:
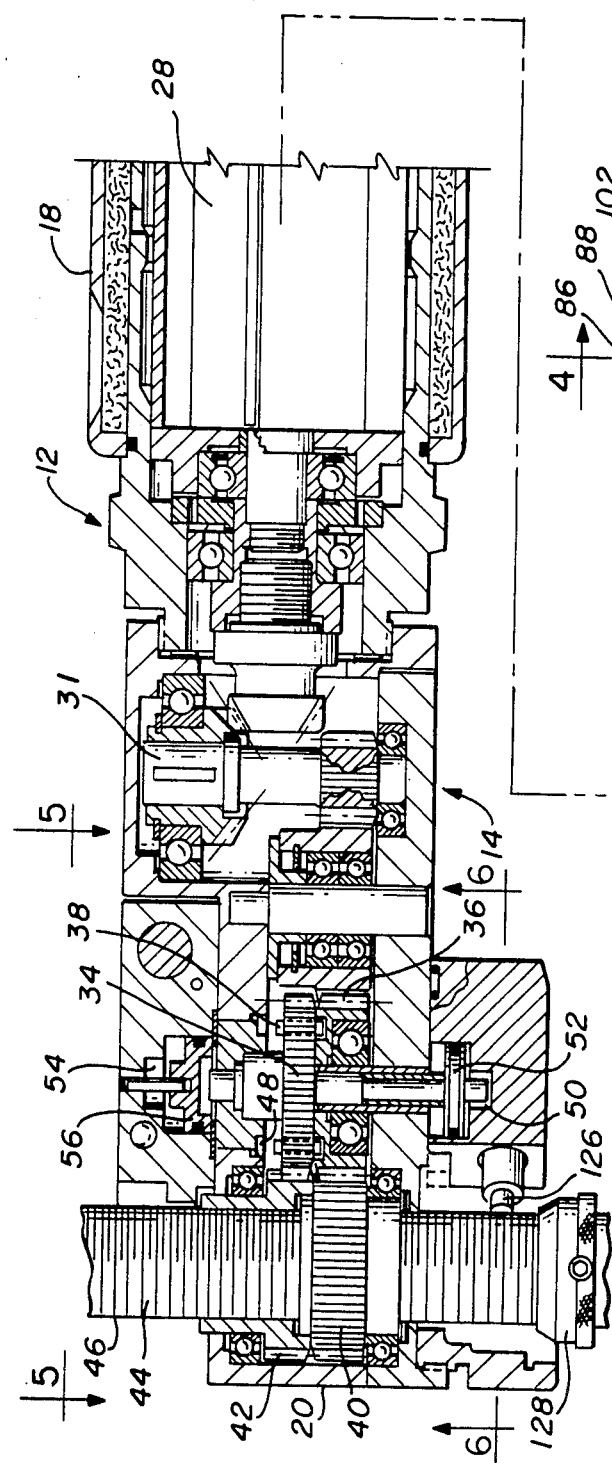
FIG. 2 is an enlarged, vertical cross-sectional view of the drill of FIG. 1 taken substantially along the line 2—2 of FIG. 1.
Figure 2:
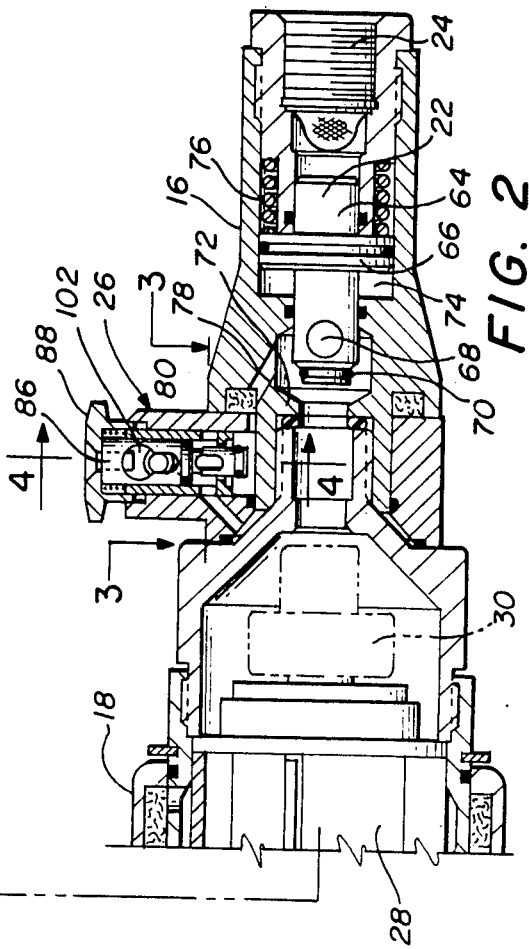

In FIG. 2, it can be seen that the control portion 16 of the housing 14 includes a main flow control valve 22 located adjacent to an inlet 24 that is arranged to be connected with a source of pressurized air (not shown). The control end portion 16 also includes a control valve 26 that will be described in detail hereinafter.

The end portion 16 is threadedly connected to the motor and gear portion 18. Contained within the motor and gear portion 18 is an air motor 28, a governor 30 (shown in dash lines) and a gear reduction 31. The gear reduction 31 is connected with the motor 28 by an output shaft 32.

The head portion 20 of the housing 14 includes a retract gear 34 that is located on a common shaft with a differential drive gear 36. As shown in FIG. 2, the retract gear is releasably connected for movement with the differential drive gear 36 by a plurality of pins 38.

The differential drive gear 36 is in mesh with a spindle drive gear 40 and the retract gear 34 is in mesh with a spindle feed gear 42. The gears 40 and 42 are carried by a drill spindle 44 that has a threaded exterior 46.

The spindle drive gear 40 operates on and is connected to the spindle 44 through a key/key slot arrangement (not shown) so that the gear 40 always rotates at the same speed and with the spindle 44. The spindle feed gear 42, which is driven by the retract gear 34, rotates in the same direction and incrementally faster than the spindle when the retract gear 34 and differential drive gear 36 are locked together by the pins 38 and the spindle 44 is fed downwardly. However, when the retract gear is moved upwardly and the pins 38 are located in recesses 48 in the housing 14, the retract gear 34 and the spindle feed gear 42 stop rotating and the drill spindle 44 is caused to retract.

The housing portion 20 includes a retract cylinder 50 having a retract piston 52 mounted therein. It can be seen that air pressure applied in the cylinder 50 will cause the retract piston 52 to move up, moving the retract gear 34 upwardly into the retract position.

Similarly, a feed cylinder 54 is provided in the housing 14 and a feed piston 56 is located therein. The feed piston 56 will positively force the retract gear downwardly into locked relationship with the differential drive gear 36 causing the drill spindle 44 to feed.

Figure 7:
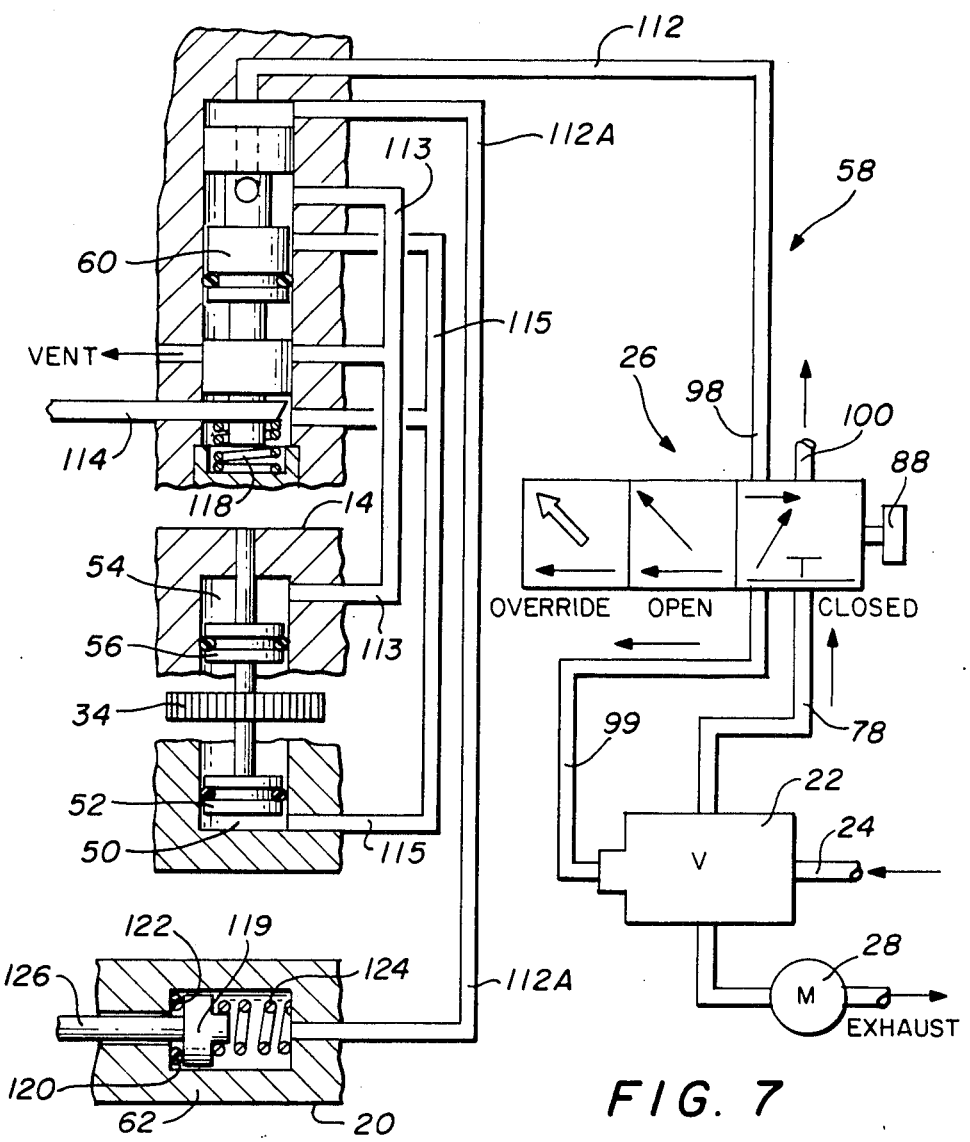
FIG. 7 is a schematic diagram of a control system utilized in the drill of FIG. 1.

The control system utilized to position the retract gear 34 is schematically illustrated in FIG. 7 and is designated by the reference character 58. Generally, the system 58 includes the flow control valve 22, the control valve 26, the retract piston 52, the feed piston 56, a retract control valve 60 and a vent valve 62. Each of these items is shown in detail in the various figures which will be described.

The flow control valve is illustrated in FIG. 2 and includes a hollow body 64 having a radially projected flange 66 thereon. The left most end of the valve 22, as seen in FIG. 2, is ported at 68 and carries an O-ring seal 70 that is engageable with a valve seat 72 in the housing portion 60. The flange 66 is disposed in a chamber 74 in the housing portion 16. Spring 76 continually biases the valve 22 toward a position wherein the seal 70 is in engagement with the seat 72, that is, toward the closed position.

The body 64 and flange 66 thereon in conjunction with the seals 77 define a piston having different areas exposed to the same pressure with the larger area being on the flange 66 in the chamber 74 so that the valve 22 can be opened, and held open, by air pressure. In the closed position, pressurized air can flow through the valve 22 and outwardly through the ports 68, through a passageway 78 in the housing portion 16 and into bore 80 that is provided for the control valve 26.

Figure 3:
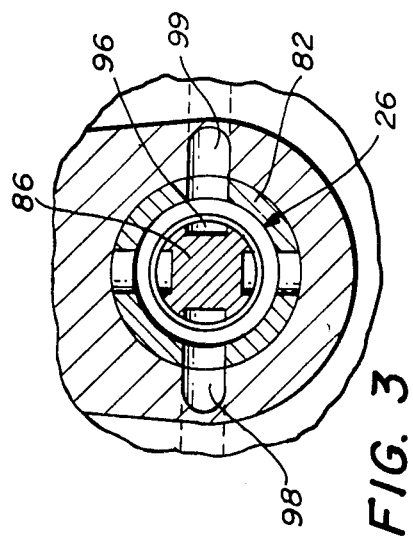
FIG. 3 is an enlarged fragmentary view taken substantially along the line 3—3 of FIG. 2.
Figure 4:
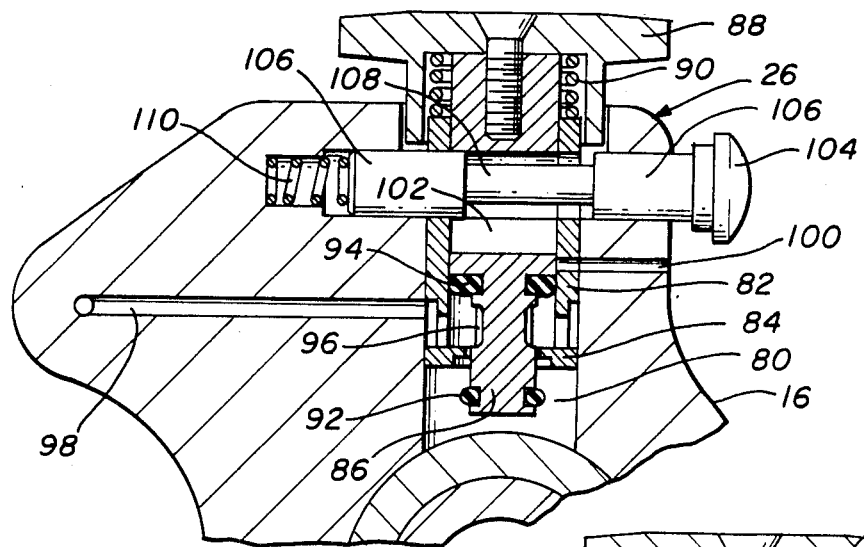
FIG. 4 is an enlarged fragmentary view taken substantially along the line 4—4 of FIG. 2.

The structure of the control valve 26 can be more readily understood from FIGS. 2, 3 and 4. The valve 26 includes a bushing 82 that is disposed in the bore 80. The bushing 82 includes a control valve seat 84 that loosely encircles a control valve member 86.

The control valve member is movably positioned within the bushing 82. At its uppermost end the control valve member 86 is provided with a cap 88 and a spring 90 encircling the control valve member 86 that biases the control valve member 86 upwardly in the bushing 82. As shown most clearly in FIG. 4, an O-ring seal 92 carried on the lower end of the control valve member 86 is biased by the spring 90 toward the valve seat 84. A second O-ring seal 94 encircles the control valve member 86 relatively above the seat 84.

Located between the seals 92 and 94 are a plurality of recesses 96 that may be more clearly seen in FIG. 3. It will be appreciated that when such recesses 96 are located adjacent to the seat 84, a substantially larger flow passageway between the seat 84 and the valve member 86 is provided. Located in the housing portion 16 and just above the seat 84 is a control passageway 98 for purposes which will become more apparent hereinafter. A second control passageway 99 extends through the housing from the valve 26 to the chamber 74. Located in the housing portion 16 and just above the seal 94, as shown in FIG. 4, is a vent passageway 100.

The control valve is a three position valve. To lock the valve 26 in the open position, the valve member 86 is provided with a key hole 102 (see FIGS. 2 and 4). A lock pin 104 extends through the bushing 82 and through the key hole 102. The lock pin 104 has large diameter portions 106 sized to slide through the larger portion of the key hole, but not through the smaller portion of the key hole. The pin 104 is also provided with a smaller diameter portion 108 that is sized to enter into the smaller portion of the key hole 102. A spring 110 biases the lock pin 104 outwardly so that the lock pin 104 will tend to be disposed in the larger portion of the key hole 102.

As shown in FIG. 1 and to connect the control valve 26 with the retract control valve 60, a conduit 112 extends from the valve 26, that is, from the control passageway 98 to the retract control valve 60 and through conduit 112A to the vent valve 62 which are located in the head portion 20 of housing 14 62. The retract control valve 60 is a two position valve that provides pressurized air through internal passageways (not shown) to the feed cylinder 54, while venting the retract cylinder 50 when in one position. In the other position, the retract control valve supplies pressurized air to the retract cylinder 50, while venting the feed cylinder 54. In either position, the control valve 60 supplies pressurized air to the vent valve 62 through conduit 112A.

The position of the valve 60 is controlled by a valve latch or lever 114 that is pivotally mounted on the end portion 20 of the housing 14. The lever projects into proximity with the drill spindle 44 so that it is engaged by a collar 116 located on the drill spindle 44 when the drill spindle 44 reaches the lower end of its feed motion. A spring 118 located in the housing portion 20 urges the valve 60 toward the feed position.

As previously mentioned, the pressurized air is supplied by the conduit 112A to the vent valve 62. The vent valve 62 is also located in the housing portion 20 and includes a valve member 119 which carries an O-ring seal 120 thereon. The valve member 119 is movable toward and away from the valve seat 122 formed in the housing portion 20. A spring 124 continually biases the vent valve member 119 toward the seat 122.

Figure 6:
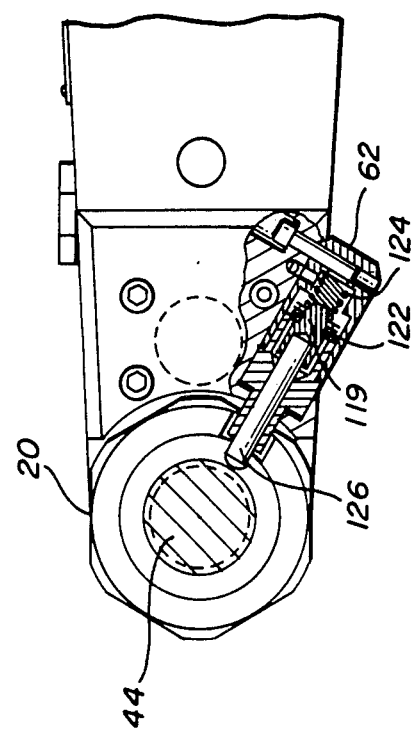
FIG. 6 is an enlarged, fragmentary view illustrating a vent valve utilized in the drill of FIG. 1.

Projecting from the opposite side of the valve member 119 is a valve stem 126. The valve stem 126 is located (as can be seen in FIG. 6) proximate the drill spindle 44 under the housing portion 20 and is arranged to engage a collar 128 that is carried by the drill spindle 44. The collar 128 is adjusted on the spindle 44 so that it will engage the valve stem 126 as the spindle 44 reaches the uppermost end of its retract motion.

OPERATION OF THE PREFERRED EMBODIMENT

The inlet 24 of drill 12 is connected to the source of pressurized air (not shown). The operator of the drill 12 depresses the button 88 on the control valve 26 moving the plunger 86 downwardly to the open position illustrated in FIG. 4. The spring 110 moves the lock pin 104 into the key hole 102 so that the control valve 26 is locked in the open position.

With the control valve 26 in the open position, air flows through the flow valve 22 and outwardly through ports 68 therein past the open valve 26 and through passageway 99 to the chamber 74. Upon reaching the chamber 74, the pressurized air displaces the flow valve 22 to the right, as illustrated in FIG. 2, opening the main flow passageway so that the pressurized air will flow directly to the motor 28.

The pressurized air also flows from the control valve through passageway 98 and conduit 112 to the retract control valve 60 and the vent valve 62. With the retract lever 114 in the position blocking movement of the valve 60, the pressurized air is directed through the conduit 113 to the feed cylinder 54.

The pressurized air in the feed cylinder 54 drives the feed piston 56 downwardly moving the retract gear 34 and the pins 38 into the differential drive gear 36 so that the retract gear 34 and differential drive gear 36 rotate at the same speed causing the spindle 44 to move downwardly.

Figure 8:
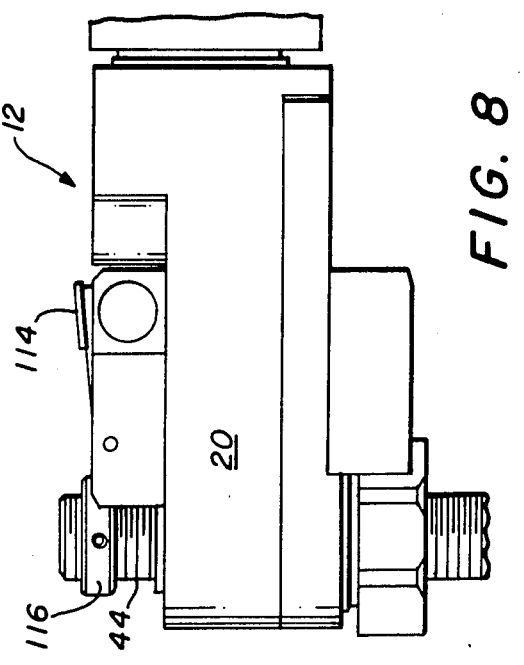
FIG. 8 is a partial, vertical elevation view of the drill of FIG. 1.

The spindle 44 continues its downward or feed movement until the collar 116 carried thereby engages the lever 114 as shown in FIG. 8. The lever 114 is moved out of engagement with the retract control valve 60 and the retract valve 60 moves into a position wherein the pressurized air is supplied through the conduit 115 to the retract cylinder 50 and the feed cylinder 54 is vented. Air in the retract cylinder 50 drives the retract piston 52 upwardly moving the retract gear 34 upwardly until the pins 38 carried thereby engage the recesses 48 in the housing 14. When this occurs, rotation of the spindle feed gear 42 ceases while the differential drive gear 36 and the spindle drive gear 40 continue to rotate. The speed differential causes the spindle 44 to start its upwardly or "retract" motion.

The retract motion continues until the collar 128 carried by the spindle 44 engages the plunger 126 on the vent valve 62. Such engagement moves the vent valve 62 into the venting position dumping the air from the control valve 60, conduit 112, passageway 98, and ultimately from the chamber 74, permitting the flow valve 22 to return to the closed position and shutting off the flow of air to the motor 28. Thus, further movement of the spindle 44 is prevented.

Figure 10:
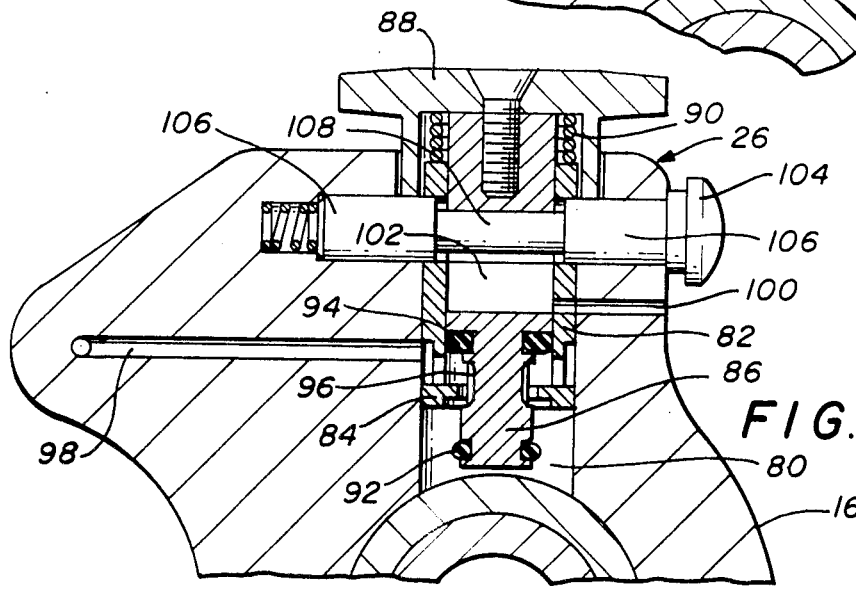
FIG. 10 is a cross-sectional view similar to FIG. 4 but illustrating the control valve in still another operating position.
Figure 5:
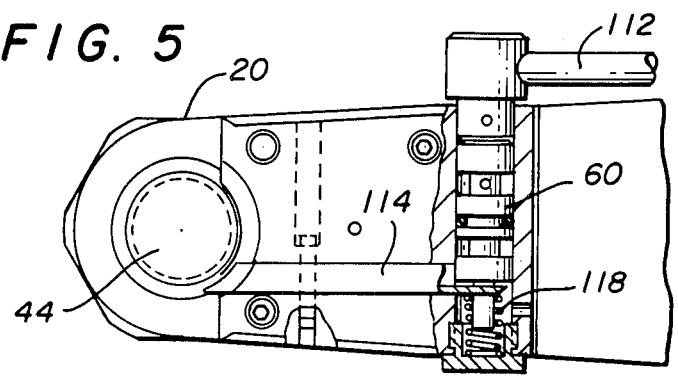
FIG. 5 is a fragmentary view illustrating a retract control valve utilized in the drill of FIG. 1 that is constructed in accordance with the invention.

If it is desired to place the drill in feed condition again, the operator depresses the cap 88 to move the valve member 86 downwardly slightly to the position illustrated in FIG. 10. In this position, the recesses 96 are located adjacent to the valve seat 84 and provide a substantially increased flow area past the seat 84. The supply of pressurized air flowing thereby is adequate to override the venting from the vent valve 62 and to move the retract gear 34 downwardly into engagement with the differential drive gear 36 returning the drill to the feed condition and, subsequently, closing the vent valve 62. The drill is in the initial feed condition.

Figure 9:
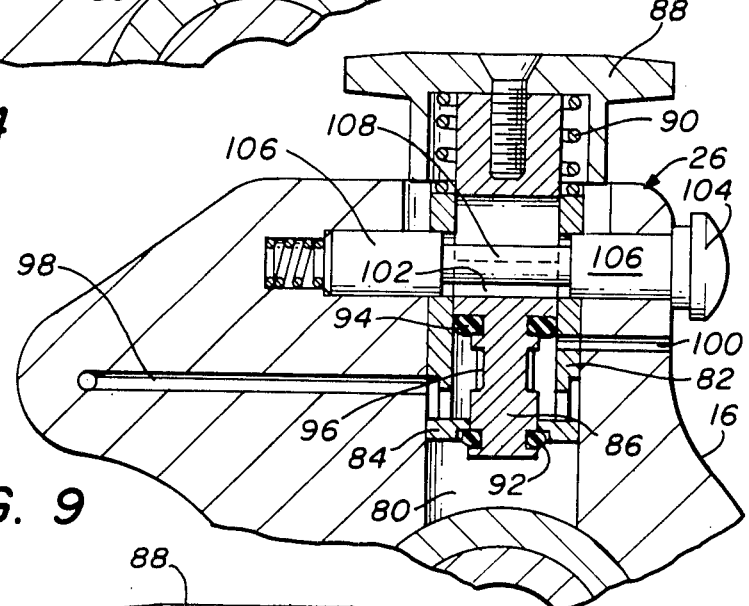
FIG. 9 is a vertical, cross-sectional view similar to FIG. 4, but illustrating the control valve in a different operating position.

In the event that the operator wishes to stop the operation of the drill, it is only necessary to move the lock pin 104 into the position wherein the small diameter 108 thereon is aligned with the small portion of the key hole 102. When this occurs, the spring 90 drives the valve member 86 upwardly until the seal member 92 engages the valve seat 84 totally shutting off the flow through the valve 26. Simultaneously, the O-ring seal 94 carried by the valve member 86 has moved upwardly past the vent passageway 100. (This condition of the valve 26 is illustrated by FIG. 9.) The vent passageway 100 is of adequate size to provide venting of the various downstream controls as well as to vent the chamber 74 which permits the main flow valve 22 to close, stopping the operation of the motor 28.

From the foregoing detailed description, it will be appreciated that the drill and control valve apparatus described herein provides for the automatic operation of a pneumatic tool having a reciprocating feed and retract motion with automatic motor stop after retract is complete. The apparatus prevents inadvertent damage to the tool even though the operator should not be present at the end of the retract motion. Also, the control valve apparatus provides for the rapid closure of the main valve in the event that it should become necessary or desirable to stop the tool.

Having described but a single embodiment of the invention, it will be understood that many changes and modifications can be made thereto without departing from the spirit and scope of the annexed claims.

What is claimed is:

1. Control valve apparatus for use with tools having a pneumatic motor therein, said valve apparatus comprising:
   a valve housing:
   a flow valve member located in a flow passageway in said housing, said valve member being moveable toward and away from a valve seat in said housing encircling said flow passageway preventing and permitting flow therethrough, respectively, to said motor;
   a control valve member moveably located in a bore in said housing and extending loosely through an annular seat encircling said bore, said control valve member carrying spaced first said second seal members and having a reduced size portion located between said seal members;
   said housing having an air supply passageway extending from said flow passageway to said bore on one side of said annular seat, a first control passageway connected with said bore for supplying air to other portions of said tool, a second control passageway extending from said bore on the other side of said annular seat to a chamber in said housing adjacent to said flow control valve member whereby pressure may be exerted thereon to open said flow passageway, and a vent passageway connected with said bore for venting air from said first and second control passageways; and,
   said control member being moveable from an open position wherein said second control passageway is open and said second seal member prevents flow through said vent passageway to a closed position wherein said first seal member engages said annular seat preventing flow from said supply passageway to said control passageways and said vent passageway is open, and to an override position wherein said reduced size portion is located adjacent to said seat for providing an excess of air flow to said second control passageway, said reduced size portion being located adjacent to said annular seat only when said control valve member is located in the override position.

2. The control valve apparatus of claim 1 wherein:
   said flow valve member includes first and second surfaces having different areas;
   said first surface being of larger area and located in said chamber in said housing;
   said second surface being located in said flow passageway; and
   said first surface being exposed to the pressure in said flow passageway when said control valve member is in said open and override positions whereby said flow valve member is moved away from said seat permitting flow through said flow passageway to the motor.

3. The control valve apparatus of claim 1 and also including resilient means biasing said control valve member toward said closed position.

4. Control valve apparatus for use with tools having a pneumatic motor therein, said apparatus including:
- a valve housing having a flow passageway extending therethrough and a valve seat encircling said passageway;
- a flow valve member located in said passageway for movement toward and away from said valve seat preventing and permitting flow therethrough respectively to the motor;
- a control valve member movably located in a bore in said housing, said control valve member having a portion of reduced size and carrying spaced first and second seal members, said reduced size portion being located between said seal members;
- an annular seat in said bore loosely encircling said control valve member;
- said housing having a supply passageway extending from said flow passageway to said bore on one side of said annular seat, a second control passageway extending from said bore on the other side of said annular seat to a chamber in said housing whereby pressure may be exerted on said flow valve member to open said flow passageway, a first control passageway for supplying air to other portions of said tool, and a vent passageway for venting air from said first and second control passageways;
- said control valve member being movable from an open position wherein said first control passageway is open and said second seal member prevents flow through said vent passageway to a closed position wherein said first seal member engages said annular seat preventing flow from said supply passageway to said control passageways and said vent passageway is open, and to an override position wherein said area of reduced size on said control valve member is located adjacent to said seat providing an excess of air flow to said second control passageway, said reduced size portion being located within said annular seat only when said control valve member is located in the override position;
- said flow valve member includes first and second surfaces having different areas;
- said first surface being of larger area and located in said chamber in said housing;
- said second surface being located in said flow passageway;
- said first surface being exposed to the pressure in said flow passageway when said control valve member is in said open and override positions whereby said flow valve member is moved away from said seat permitting flow through said flow passageway to the motor;
- resilient means biasing said control valve member toward said closed position; and
- lock means engaging said control valve member and said housing for retaining said control member in said open position.

5. The control valve apparatus of claim 4 wherein:
- said housing has a hole extending substantially therethrough and generally perpendicularly to said bore;
- said control valve member has a key hole therethrough arranged to be aligned with said hole; and,
- said lock means including a lock pin having a pair of diameters sized to fit within said key hole whereby said control valve member is retained in said open position when the larger diameter of said lock pin is disposed in the larger diameter portion of said key hole and said resilient means moves said control valve member toward said closed position when the smaller diameter of said lock pin is disposed in said key hole.

* * * * *